United States Patent [19]

Whitney

[11] 4,347,443

[45] Aug. 31, 1982

[54] ROOM THERMOSTAT WITH ELECTRONIC CIRCUIT BOARD HEAT REMOVAL AIR WASH

[75] Inventor: John M. Whitney, Minneapolis, Minn.

[73] Assignee: Honeywell Inc., Minneapolis, Minn.

[21] Appl. No.: 275,003

[22] Filed: Jun. 18, 1981

[51] Int. Cl.³ .................. H01H 35/14; H02B 1/00
[52] U.S. Cl. ................................ 307/117; 361/383
[58] Field of Search ............... 307/117; 361/383, 384

[56] References Cited

U.S. PATENT DOCUMENTS 3,749,934 7/1973 Kompelien ..................... 307/117
3,940,665 2/1976 Seki ................................ 361/383

Primary Examiner—Michael L. Gellner

Attorney, Agent, or Firm—Clyde C. Blinn

[57] ABSTRACT

A room thermostat having an electronic circuit board mounted in a cover and attached to a base member. A space is provided between the back side of the circuit board and the front of the thermostat cover whereby air can pass along the back side of the circuit board to "air wash" for removing heat which is generated by the electrical components mounted on the front side of the circuit board. The front side of the circuit board has a cover over the electrical components for shielding the heat from the components from a temperature responsive element. The temperature responsive element is mounted in a channel provided by the thermostat cover and shield to allow air flow past the temperature responsive means through a channel which includes the space between the thermostat cover and the base.

11 Claims, 4 Drawing Figures

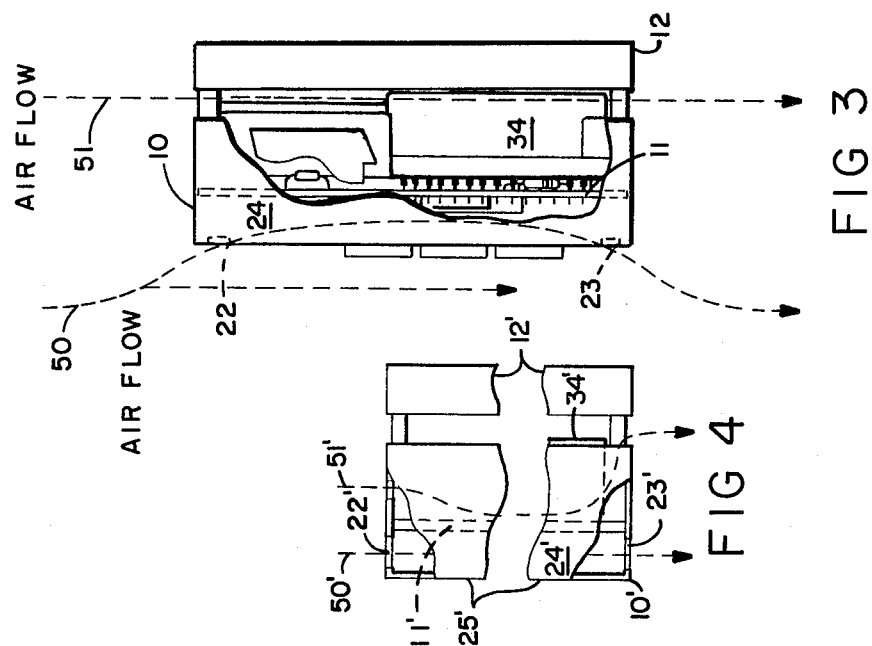
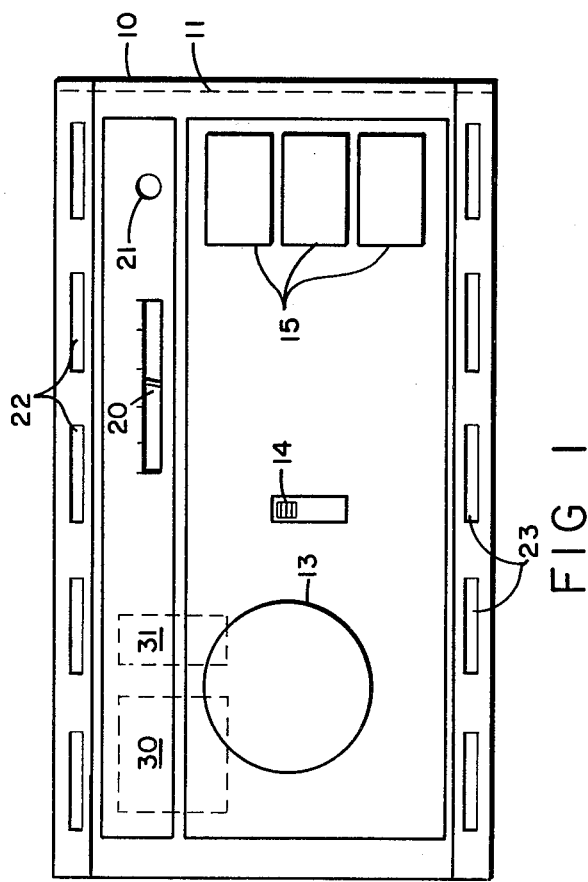
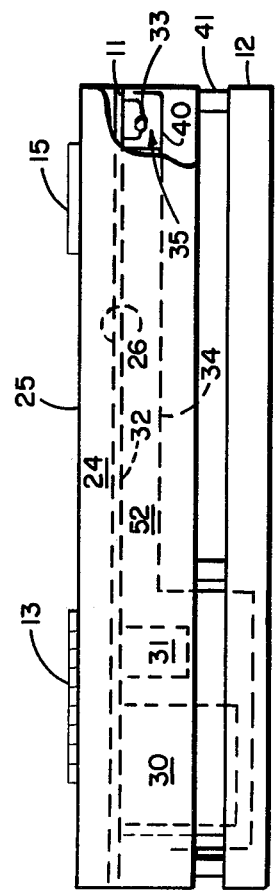

ROOM THERMOSTAT WITH ELECTRONIC CIRCUIT BOARD HEAT REMOVAL AIR WASH

BACKGROUND AND SUMMARY OF THE INVENTION

While the proper air flow to a temperature responsive element of a space or room thermostat has been provided in many ways, and the removal of heat from electrical components of a thermostat has always been a design problem with thermostats, the present invention provides for a novel manner of incorporating both in a thermostat.

The circuit board is mounted in the thermostat cover with the electrical components on the front side with the electrical connections or soldered connections on the back side. The back side of the circuit board is placed adjacent the front surface of the thermostat cover so that an "air wash" can take place by the passage of air along the back side of the circuit board to remove the heat from the electrical connections. The heat generated by the electrical components on the front side of the circuit board does not adversely affect the temperature responsive element. The temperature responsive element is mounted on the front side of the circuit board and shielded from the electrical components. A channel is provided for space or room for air to flow past the temperature responsive element.

BRIEF DESCRIPTION OF THE DRAWINGS

FIG. 1 is a front view of the thermostat showing the openings at the upper and lower edge of the cover;

FIG. 2 is a bottom view of the thermostat of FIG. 1;

FIG. 3 is a side view of the thermostat shown in FIG. 1 with a cut away portion to show the circuit board and shield over the electrical components mounted on the front surface of the circuit board; and FIG. 4 is another embodiment of the present invention showing the openings on the upper and lower surface of the cover of the thermostat of FIG. 1.

DESCRIPTION OF THE PREFERRED EMBODIMENT

Referring to FIG. 1, a thermostat for responding to the temperature of a room or space has a cover member 10 which supports as an assembly an electrical circuit board 11. The cover assembly is mounted on a base 12 as shown in FIG. 2. The thermostat has a set point adjustment knob 13, a deviation selection switch 14, a plurality of system buttons or switches 15, a temperature indicator 20, and a system indicator light 21, all of which are no part of the present invention.

Cover 10 has a plurality of openings 22 at the top of the cover and a plurality of openings 23 at the bottom of the cover. These openings provide for an "air wash" or air flow through the space, passage or chamber 24 between the rear surface of circuit board 11 and a front surface 25 of the cover 10 to remove the heat from the circuit board. The heat is developed by components such as a power supply 30, a signal circuit 31, and other components making up the electrical or electronic circuit of the thermostat mounted on a front surface 32 of circuit board 11. As the soldering of the various component connections to connect the components into the electrical circuit is done on rear surface 26 of circuit board 11, the heat from the components is transmitted through circuit board 11 and the "air wash" passing through space 24 removes the heat. A temperature responsive element 33 is mounted on the front side of the circuit board.

A shield member 34 covers front side 32 of the circuit board and encloses the various components such as 30 and 31 which give off heat. The shield then keeps the heat from moving into an area or channel 35 containing temperature responsive element 33.

Specifically, channel 35 is formed by a portion 40 of shield 34 to not only provide channel 35, but protect the temperature responsive element from physical contact.

The cover 10 and circuit board 11 with the shield 34 mounted thereon are attached to base 12 by connections 40 and 41 which might be hinged to allow for easy access to the thermostat base 12 for providing the necessary electrical connections to the remote temperature conditioning apparatus or furnace through the wall on which the thermostat base is mounted.

DESCRIPTION OF THE SECOND EMBODIMENT

Another embodiment of the present invention is shown in FIG. 4 wherein the cover 10' has openings at the top and bottom shown as 22' and 23' whereby the air flow to "air wash" the circuit board 11' passes through the chamber 24' between the back side of the circuit board 11' and the front surface 25' of the cover.

DESCRIPTION OF THE OPERATION OF THE INVENTION

An electronic thermostat which has components 30 and 31 as well as others, which give off a considerable amount of heat, presents a design problem as the heat can adversely affect the output of temperature responsive element 33. When the electrical components are connected to circuit board 11 in either a manual or an automatic assembly line, the connections for the components are made on back side 26 of circuit board 11 and the back side contains a considerable amount of soldered connections to which the heat of the components is conducted. By means of passage 24 between back side 26 of the circuit board and front surface 25 of the cover, an "air wash" takes place in that the air passes either downward or upward through passage 24 and openings 22 and 23 as shown in FIG. 1. Referring to FIG. 3, the air flow is shown by means of the dotted lines 50 and 51. The air flow is shown to be downward as when the thermostat is mounted on a wall, the cold wall surface which more likely occurs when the temperature of the wall is reduced from the normal temperature maintained in the space during a temperature set back period. The downward flow of air provides the "air wash" of the circuit board through passage 24 and the downward flow of air 51 provides for the sensing of the space temperature by the temperature responsive element 33. Under certain conditions, the air flow in passage may be upward due to the heat of the circuit board 11. The air flow may then circulate out of opening 22 and join the downward air flow. Regardless of the air flow direction over the thermostat when mounted on a wall, the "air wash" through passage 24 removes the heat from circuit board 11.

The shield 34 which also provides an electrostatic shield provides for the containment of the heat of the components 30 and 31 so that the heat does not adversely affect temperature responsive element 33. Element 33 is contained in channel 35 through which air flow representative of the space or room temperature.

The containment of the heat in the chamber 52 under shield 34 and between the front surface 32 of the circuit board increases the conduction of heat through the electrical connections of the circuit board to the back side 26 to be "air washed" by the air passing in space 24.

Similarly, the "air wash" takes place of the circuit board 11' in FIG. 4 except that the openings are on the upper and lower surface of the cover 10'. Air flow exists on both sides of circuit board 11 as shown by 50' and 51'.

The embodiments of the invention in which an exclusive property or right is claimed are defined as follows:

1. A thermostat comprising
    a base member adapted to be mounted on a wall of a space in which the temperature is to be controlled,
    a cover member,
    a circuit board means for supporting electrical components of an electrical circuit on a front side of said board means, said components including a temperature responsive element, a power supply circuit, a signal output circuit,
    means for mounting said circuit board in said cover member with space between the back side of said circuit board and said cover to allow air to flow over said circuit board to remove heat therefrom,
    shield means attached to said front side of said circuit board to shield said temperature responsive element from heat generated in said power supply circuit and signal output circuit, and
    means connecting said circuit board means to said base member.

2. The invention of claim 1 wherein
said cover member has openings to allow air to flow over said back side of said circuit board to remove heat developed by said electrical components.

3. The invention of claim 2 wherein
said openings are in the front surface of said cover along the upper and lower edges.

4. The invention of claim 2 wherein
said openings are in the upper and lower sides of said cover.

5. The invention of claim 1 wherein
said shield means forms a channel of air to flow past said temperature responsive means and contains the heat of said components therein so the heat is conducted through said circuit board.

6. The invention of claim 5 wherein
said means connecting said circuit board to said base member supports said cover away from said base member so that space air can flow between said base and said cover to enter said channel to be responded to by said responsive element.

7. The invention of claim 2 wherein
said circuit board has electrical connections on said front side for said components and heat generated from said components is transmitted to said electrical connections to be carried away by said air flow.

8. The invention of claim 7 wherein
said air flow on said front side of said circuit board is for "air wash" to remove heat while air flow in a flow passage on the front side of said circuit board outside said shield means is to provide for an air flow to said responsive element indicative of the temperature of the space.

9. The invention of claim 5 wherein
air flow after a period of lower temperature in the space is downward through said channel past said temperature responsive element.

10. The invention of claim 1 wherein
said means connecting said circuit board means to said base member holds said cover member and provides electrical connections to the terminals on said base member.

11. The invention of claim 4 wherein said openings exist on both sides of said circuit board whereby an "air wash" takes place on both sides of said circuit board.

* * * * *